United States Patent [19]

Tyson et al.

[11] 4,024,991
[45] May 24, 1977

[54] IMPARTER TO PROVIDE SILVER TO WATER SUPPLIES

[76] Inventors: George Noblit Tyson, 4950 N. Live Oak Canyon Road, LaVerne, Calif. 91750; Robert Roy Austin, 2270 E. Orange Grove Blvd., Pasadena, Calif. 91104

[22] Filed: Nov. 28, 1975

[21] Appl. No.: 636,065

[52] U.S. Cl. .............................. 222/189; 141/286; 210/466; 210/474; 210/501
[51] Int. Cl.² .......................................... B67D 3/00
[58] Field of Search .................... 141/363–366, 141/285, 286, 290, 308, 309, 307, 310; 210/474, 466, 501; 222/146 C, 181, 185, 189

[56] References Cited

UNITED STATES PATENTS

| 1,228,836 | 6/1917 | Schulse | 222/185 |
|---|---|---|---|
| 3,327,859 | 6/1967 | Pall | 210/501 |

Primary Examiner—Houston S. Bell, Jr.
Attorney, Agent, or Firm—Donald D. Mon

[57] ABSTRACT

An imparter to impart silver to a water system wherein air is drawn into a receiver container when water is withdrawn from the receiver container into a storage container. The water is withdrawn from the receiver container through an opening that is disposed below the level of water in the receiver container and its lower end is beneath a maximum water elevation in the storage container and above some lower elevation therein. The imparter is placed in the opening. It has a dimension of thickness defined by a pair of end walls which partially define a cavity in the imparter body. There are perforations in both of the end walls to permit water to flow through the cavity and thereby through a bed of silver imparting material inside the cavity. This material has the inherent property of transferring silver into the water as a consequence of contact therewith. Air vent means extends from end wall to end wall of the body to admit air to the receiver container along an entry path separate from a discharge path that goes through the cavity. The air vent means is so proportioned, disposed and arranged that air enters the receiver container via the air entry path in preference to the discharge path and water exits from the receiver container via the discharge path in preference to the entry path.

14 Claims, 8 Drawing Figures

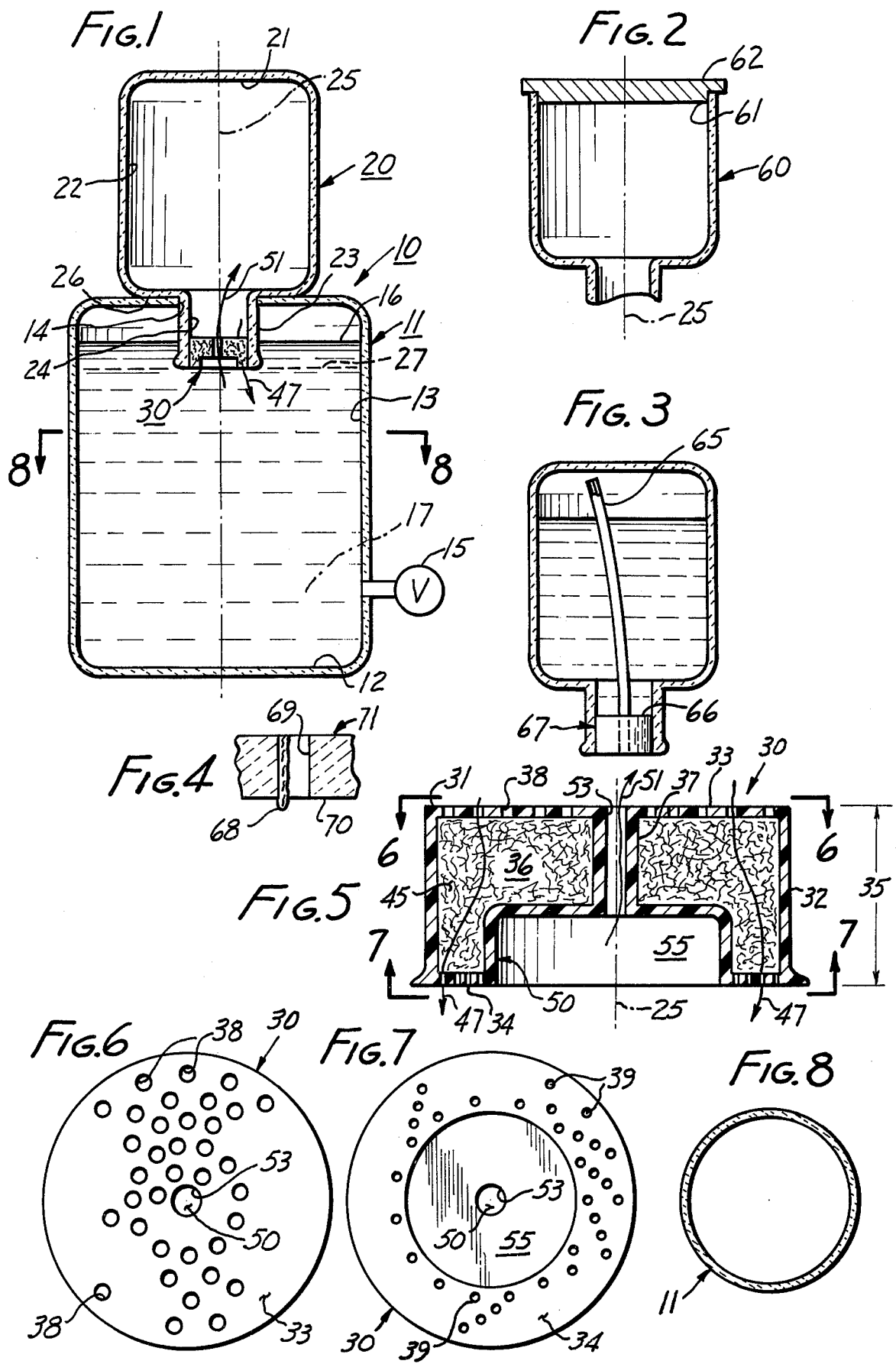

IMPARTER TO PROVIDE SILVER TO WATER SUPPLIES

This invention relates to water supply systems such as conventional residence and office water coolers.

One conventional type of water cooler or water storage system includes a storage container which often is an olla provided with a valve for withdrawing stored water from it. The water itself, which often is spring water or specially prepared water, is initially contained in a receiver container that may be refilled in place. More usually it is removed when empty and replaced with a full container. Such receiver containers customarily have a neck with an opening. When the receiver container is turned upside down, the neck projects down into the storage container, with its opening standing below a customary upper water level and above a minimum water level in the storage container. Classically, air at atmospheric pressure is present in the storage container, and air in the receiver container has been percolated upwardly through the water therein, when water was withdrawn from the storage container. The typical bubbling while withdrawing a glass of water from an office water cooler is well known.

Because these water supplies utilize water held in storage often for substantial periods of time, it is desirable to provide some protection against bacteria from certain sources. One particularly troublesome bacteria is the air-borne pathogenic bacteria which may, and often do, invade the equipment with the air that enters when the equivalent amount of water is withdrawn. It is an object of this invention to provide means which conveniently can be placed in the opening of the receiver container that will provide protection from this air-borne bacteria.

An imparter to impart silver according to this invention, comprises a body having a dimension of thickness defined by a pair of end walls. These walls are spaced apart and are at different elevations when placed in the opening of the receiver container when it is installed. A cavity is formed in the body of the imparter and is at least partially defined by these end walls. It contains a bed of silver imparting material. The material has the inherent property of transferring silver into the water as a consequence of contact therewith. Air vent means extends from end wall to end wall of the body to admit air to the receiver container along an entry path which is separate from a discharge path for water through the cavity. The air vent means is so proportioned, disposed and arranged that air enters the receiver container via the entry path in preference to the discharge path, and water exits from the receiver container via the discharge path in preference to the entry path.

According to a preferred but optional feature of the invention, the air vent means comprises a conduit passing through the body with a restrictor portion having a cross-section sufficiently small to retard the dynamic flow of water through the conduit, but sufficiently large to permit ready dynamic flow of air into the receiver container.

According to another preferred but optional feature of the invention, an enlarged open-ended sink is formed adjacent to the end wall which is at the bottom of the imparter and beneath the elevation of the restrictor portion when it is installed in a receiver container, whereby when the water level in the storage container falls below the sink, the water in the sink drops into the storage container and tends to open the air vent means for air flow.

The above and other features of this invention will be fully understood from the following detailed description and the accompanying drawing in which:

FIG. 1. is a vertical axial cross-section and elevation of the presently preferred embodiment of the invention;

FIG. 2. is a fragmentary cross-section of an optional construction for a portion of FIG. 1;

FIG. 3. is a vertical axial cross-section showing another embodiment of the invention;

FIG. 4. is a fragmentary cross-section showing still another embodiment of the invention;

FIG. 5. is an enlarged axial cross-section of the imparter of FIG. 1;

FIGS. 6. and 7. are top and bottom views, respectively, of FIG. 5; and

FIG. 8. is a cross-section taken at line 8—8 of FIG. 1.

In FIG. 1 there is shown a water system 10 incorporating the invention. This is a classical water cooler, frequently found in residences and offices and supplied by bottled water companies. It includes a storage container 11 which has a bottom 12, a side wall 13, and an aperture 14. In order to withdraw water from the storage container an on/off valve 15 is provided at a lower elevation, usually near the bottom of the storage container. It is customary but not necessary for the storage container to be made of porous clay. Then it is frequently called an "olla". The evaporation from the porous surface of the olla cools the stored water. Alternatively the device may be glazed and impermeable. It has as its objective to store water between a potential upper water level 16 and a potential lower water level 17.

The water system also includes a receiver container 20 which is shown in its inverted, installed, position in FIG. 1. Usually this is a 5-gallon glass bottle with a bottom 21, a peripheral side wall 22, and a neck 23. An opening 24 in the neck extends from the inside of the bottle to the outside. The neck ordinarily has a length relative to vertical axis 25 long enough for the shoulder 26 of the bottle to rest on the storage container at aperture 14 with the opening disposed below level 16 and above level 17. More precisely, it is at an elevation 27.

When the water level is below elevation 27, the tendency is for air to transfer into the receiver container and for water to be transferred from the receiver container to the storage container. It is the object of this invention to include in the system an imparter 30 which will impart silver to water which flows to the storage container so as to give some protection against air-borne bacteria drawn into the system with the air that enters the storage container, and especially the receiver container, when water is withdrawn from the system.

The presently preferred embodiment of imparter 30 is shown in full detail in FIG. 5. Dimensions of thickness and the like refer to axis 25, which is the vertical axis of the system when the system is installed. It will be understood that this reference is for convenience in disclosure, and forms no necessary limitation on the invention. It is possible to have the container and imparter in orientations other than vertical, provided that the imparter is in the flow path between the containers in such a way that the air and water can transfer in a manner yet to be described.

The imparter includes a body 31 which can conveniently be made of a plastic which is compatible with the water, such as polyethylene or polypropylene. It includes a peripheral side wall 32 and a pair of end walls 33, 34. The end walls define a dimension of thickness 35 along axis 25 and at least partially bound a cavity 36 in the body. The cavity is additionally bounded by the peripheral side wall and by an inner wall 37 which will be described in more detail below.

The cavity is filled with a bed of silver-imparting material 45. This material has the property of transferring silver into the water as a consequence of contact therewith. It is preferably granular, and the granules preferably fill the cavity. Interstitial spaces are formed between the particles that permit water to flow through the bed much as in a filter bed. The flow of water is through the perforations 38, through the cavity and silver-imparting material, and then through perforations 39 along a discharge path schematically illustrated by arrows 47.

Inner wall 37 defines air vent means 50. This air vent means extends from end to end of the imparter. It is so proportioned, disposed, and arranged that air will flow through the air vent means along an air entry path schematically illustrated by arrow 51 and up and into the receiver container. It is so proportioned, disposed and arranged that air flows along this path in preference to flowing upwardly through the discharge path, and also so that water exits from the receiver container via the discharge path in preference to the entry path. This is as a consequence of the size and length of the air vent means and their effect upon the dynamic flow of the air and of the water. The imparter is entirely filled with water under static conditions. For this purpose, the air vent means has a restrictor portion 53 of relatively small diameter, perhaps ¼ inch and a length of perhaps 1½ inches. Any other suitable fluid restrictor which will provide the desired dynamic properties may be used instead. A sink 55 comprising an enlarged continuation of the air vent means has a diameter of perhaps 2 inches and an axial depth of perhaps ½ inch. The outside diameter of the imparter is suited to the opening it must plug, perhaps 1½ inches diameter, and the thickness of the body may be about two inches outside measure from end wall to end wall. The wall itself may be about ⅛ inch thick.

In the operation of this device it will be noted that when the water in the storage container falls below elevation 27, the water simply drops out of the enlarged sink 55 and takes with it most of the water in the restrictor portion. Air can then flow rapidly upward through this open air vent means. The air vent means is then sufficiently restricted that water will preferentially flow dynamically along the discharge path rather than through the air vent means so that the transfer of air and water is with the air along entry path 51 and the water along discharge path 47. Similarly, the properties of the bed are such as to discourage the upward flow of air and encourage the downward dynamic flow of water. As a consequence, most of the water which reaches the storage container will carry with it silver which protects the water against pathogenic bacteria which may have been entrained in the system with the air. It is of course diluted by such minor amounts of water as flow through the air vent means.

FIG. 2. shows that a receiver container 60 can be a relatively permanent installation provided with a top aperture 61 covered by a sealing lid 62 which can be removed and water poured into it. This may be used instead of the replaceable container of FIG. 1.

FIG. 3 shows that instead of providing the air vent means only at the imparter, a continuous flexible tube can be installed in body 66 so as to convey the air upwardly nearly to the top of the installed receiver container. In this arrangement, the air does not have to bubble through the water, but instead is conveyed directly to the top where it comes into contact only with the surface of the water, and does not percolate through it as in FIG. 1. However, the presence of the tube may be regarded as unsightly by many people. The device of FIG. 5 does not require the tube and still it provides an effective means for imparting silver. Apart from this change in the air vent means the construction of the imparter 67 of FIG. 3 is identical to that of imparter 30 in FIG. 1.

FIG. 4 shows that instead of providing the restrictor portion as an open, relatively restricted conduit, it may be provided with a wick 68 in the air vent means 69. The effect of the wick is to permit ready dynamic flow of air there-through, but to slow or repress entirely the dynamic flow of water therethrough. As shown in FIG. 4, the wick should project somewhat below the end wall 70 and it will be found that when the water falls below elevation 27, the wick tends to permit water to drain out of the wick at a greater rate than it is replaced by water from the receiver container, thereby to disturb the air-water pressure balance. The wick occupies about 10% of the cross-section of the air vent means. The open section functions as in FIG. 1, while the wick assures that the water will drain from means 69 sufficiently to start the operation. Air therefore flows upwardly, establishing some sort of equilibrium wherein air flows upwardly but little if any water flows downwardly through the wick and the major portion of the water therefore flows through the discharge path past and in contact with the silver-imparting material as heretofore. Apart from this modification, imparter 71 in FIG. 4 is identical to that shown in FIG. 5.

The air vent means is sometimes referred to as a "conduit". It will be understood that the restrictor portion could instead of being a relatively long small bore conduit, be a relatively larger one with a restrictor placed in it.

The operation of the system should be evident from the foregoing. The storage container is initially filled to some desired level, and then the receiver container, which usually will be a full bottle, will be inverted after the imparter is placed in its neck, and placed as shown in FIG. 1. If the level in the storage container is below elevation 27, air will percolate into the receiver container until an equilibrium is reached which ordinarily leaves the water level in the storage container well above the elevation 27. Water is withdrawn from the storage container by opening valve 15, and after a time, the water in the storage container will fall below elevation 27. As soon as it passes below elevation 27 and breaks loose from the bottom of the imparter, the water in the sink in the constructions of FIGS. 1 and 5 will drop out and open the air vent means. Air will dynamically flow upwardly through the central conduit, while preferentially the water will not. Instead the water will flow downwardly through the discharge path in contact with the silver-imparting means and take the silver with it. Of course the water which was already in the imparter will have a certain initial concentration of silver. The air will not preferentially flow upward through the discharge path because it offers more resistance to dynamic flow of air than does the central air vent means. Therefore the preferred pattern is achieved. This is a simple construction to make and is the preferred embodiment.

In FIG. 3 the operation is identical, except that only air can flow upwardly through the tube because the tube terminates above the water level. Water cannot possibly flow upwardly through the air vent means. This offers some minor advantages but has the disadvantage of a foreign body in the receiver container which may be objectionable to some people.

The wick construction of FIG. 4 operates substantially the same as the air vent means of FIG. 5 in that it reduces the size of a relatively large conduit but still leaves a passage which is readily traversed by dynamically moving air, but is not so readily traversed by moving water. Accordingly, the wick will enable the air to traverse quite readily as soon as it is drained sufficiently after the water falls below elevation 27, and the transfer of water will be as before.

The silver-imparting material can be any desired material which upon contact with water will transfer silver into it. A very advantageous material is activated carbon on whose surfaces metallic silver has been deposited by plating or otherwise. Even granular silver can be used, but it is best to provide this material with as large a silver surface as possible in order to transfer a suitable quantity of silver to the water after even relatively brief periods of contact. The term "transfer" of silver means any system or technique whereby silver ion is put into aqueous solution. For this reason, silver compounds (slowly soluble) and metallic silver are suitable.

This invention thereby provides a readily replaceable throwaway cartridge which can protect the water system from airborne bacteria with the attendant advantages of this protection.

This invention is not to be limited by the embodiments shown in the drawings and described in the description which are given by way of example and not of limitation but only in accordance with the scope of the appended claims.

We claim:

1. An imparter to impart silver to a water system wherein air is drawn into a receiver container when water is withdrawn from the receiver container to a storage container through an opening that, during said withdrawal, is below the water level in the receiver container, the air entering the receiver container through said opening, said imparter comprising: a body so proportioned and arranged as to fit in said opening, and having a dimension of thickness, a pair of spaced-apart end walls forming part of said body and defining said dimension of thickness and at least partially bounding a cavity in the body, there being perforations in both of said end walls to permit water to enter, to flow through, and to exit from the cavity along a discharge path, a permeable packing of silver imparting material in said cavity on said discharge path having the inherent property of transferring silver into the water as a consequence of contact therewith, and air vent means extending from end wall to end wall of the body which admits air to the receiver container along an entry path separate from the discharge path, the air vent means, and the perforations and packing, being so proportioned, disposed and arranged that air enters the receiver container via the air path in preference to the discharge path, and water exits from the receiver container via the discharge path in preference to the entry path.

2. An imparter according to claim 1 in which the air vent means comprises a conduit extending through the body from end wall to end wall, and a wick in said conduit, said wick retarding the dynamic flow of water through said conduit, but enabling the dynamic flow of air.

3. An imparter according to claim 1 in which the air vent comprises a conduit extending through the body from end wall to end wall, the conduit having a restrictor portion with a cross-section sufficiently small as to retard the dynamic flow of water through the conduit, but large enough to permit ready entry of air into the receiver container.

4. An imparter according to claim 3 in which an enlarged open-ended sink is formed adjacent to the end wall which is at the bottom of the imparter when installed in a receiver container, and is beneath the elevation of the restrictor portion when so installed, whereby when the water level in the storage container recedes below said opening, water in said sink drops into the storage container.

5. An imparter according to claim 1 in which the silver imparting material is granular and forms a porous bed of material with interconnected interstitial spaces through which water flows in passing from the receiver container to the storage container.

6. A water supply system comprising: a receiver container having a neck and an opening in the neck; a storage container for storing water from the receiver container, the neck depending into the storage container, and the opening being at an elevation between a possible lower water level and a possible upper water level in the storage container; and an imparter to impart silver to water in said system comprising a body so proportioned and arranged as to fit in said opening, and having a dimension of thickness, a pair of spaced-apart end walls forming part of said body and defining said dimension of thickness and at least partially bounding a cavity in the body, there being perforations in both of said end walls to permit water to enter, to flow through, and to exit from the cavity along a discharge path, a permeable packing of silver imparting material in said cavity on said discharge path having the inherent property of transferring silver into the water as a consequence of contact therewith, and air vent means extending from end wall to end wall of the body which admits air to the receiver container along an entry path separate from the discharge path, the air vent means, and the perforations and packing, being so proportioned, disposed and arranged that air enters the receiver container via the air path in preference to the discharge path, and water exits from the receiver container via the discharge path in preference to the entry path.

7. A system according to claim 6 in which the air vent means comprises a conduit extending through the body from end wall to end wall, and a wick in said conduit, said wick retarding the dynamic flow of water through said conduit, but enabling the dynamic flow of air.

8. A system according to claim 6 in which the air vent comprises a conduit extending through the body from end wall to end wall, the conduit having a restrictor portion with a cross-section sufficiently small as to retard the dynamic flow of water through the conduit, but large enough to permit ready entry of air into the receiver container.

9. A system according to claim 8 in which an enlarged open-ended sink is formed adjacent to the end wall which is at the bottom of the imparter when installed in a receiver container, and is beneath the elevation of the restrictor portion when so installed, whereby when the water level in the storage container recedes below said opening water in said sink drops into the storage container.

10. A system according to claim 6 in which the silver imparting material is granular and forms a porous bed of material with interconnected interstitial spaces through which water flows in passing from the receiver container to the storage container.

11. An imparter according to claim 3 in which the silver imparting material is granular and forms a porous bed of material with interconnected interstatial spaces through which water flows in passing from the receiver container to the storage container.

12. An imparter according to claim 4 in which the silver imparting material is granular and forms a porous bed of material with interconnected interstatial spaces through which water flows in passing from the receiver container to the storage container.

13. A system according to claim 8 in which the silver imparting material is granular and forms a porous bed of material with interconnected interstitial spaces through which water flows in passing from the receiver container to the storage container.

14. A system according to claim 9 in which the silver imparting material is granular and forms a porous bed of material with interconnected interstitial spaces through which water flows in passing from the receiver container to the storage container.

* * * * *